3,188,368
COMPOSITION, CASTING AND PROCESS FOR PRODUCING A HIGH-TEMPERATURE RESISTANT CONCRETE
Robert F. Stewart and Ben T. Larsen, Granada Hills, and John D. McClendon, Canoga Park, Calif., assignors to North American Aviation, Inc.
No Drawing. Continuation of abandoned application Ser. No. 11,493, Feb. 29, 1960. This application Aug. 13, 1963, Ser. No. 301,905
6 Claims. (Cl. 264—56)

This application is a continuation of copending application Serial No. 11,493, filed February 29, 1960, now abandoned. The present invention relates to an improved concrete composition. More particularly, this invention relates to a high temperature, erosion-resistant concrete composition.

Air and space vehicle powerplants, such as jet and rocket engines, produce high velocity streams or jets of high temperature gases of combustion. In testing, warming up, and launching of such vehicles, the high temperature exhaust gases impinge upon the test stand floors, exhaust flame deflectors, runways, or launching pads, as the case may be. The impinging gases are deflected by the construction materials of the test stand floors, exhaust flame deflectors, runways, or launching pads. A problem presents itself in providing suitable material for withstanding the destructive effect of the high velocity, high temperature exhaust products. Conventional concrete, when exposed to a supersonic high temperature gas stream, undergoes serious erosion. In the past, large flame deflectors for the static testing of rocket engines have been constructed of steel. The steel deflectors require a film of water, on which the exhaust gases impinge, for cooling purposes. Since the water will vaporize very rapidly upon coming in contact with the hot gases, very large amounts of water are required to maintain the film and adequately cool the deflecting surfaces. However, by the very nature of rocket engine testing, the area in which tests are conducted sometimes lacks water in the quantities required for water film cooled deflectors. In the case of jet aircraft runways, the maintaining of water films to protect the surface of the runway would be impractical. A need, therefore, exists for a material which will satisfactorily deflect high velocity and high temperature gas streams without the use of water cooling means.

It is, therefore, an object of this invention to provide a high temperature resistant material. It is also an object of this invention to provide a material which is resistant to the erosion action of high temperature, high velocity gaseous streams. Another object of this invention is to provide deflectors, often referred to as flame deflectors, for high temperature, high velocity gaseous streams, which do not require a surface film of water. It is also an object of this invention to provide a flame deflector which is relatively inexpensive and therefore suitable for the construction of jet aircraft runways as well as of launching pads and test stand floors. Still another object of this invention is to provide flame deflectors which can be readily manufactured at or near the site where they are to be used, with a minimum expense and a minimum requirement of transportation of the components employed. Still other objects of this invention will be apparent from the discussion which follows.

The above and other objects of this invention are accomplished by providing a refractory mixture for a high temperature resistant concrete comprising particles of (1) at least one component selected from the class consisting of alumina, zirconia, oxides of the Group VIII elements of the Periodic Table, and silicon carbide, and (2) at least one member selected from the group consisting of Group IA metal oxides and Group IIA metal oxides, wherein at least one of said components is calcium oxide and (3) silica in proportions such that the mol ratio of (2) to (3) is from about 1.7 to about 2.4 in that portion of said mixture having particles of a size which will pass through a U.S. No. 4 mesh screen, and wherein the amount of (2) plus (3) is sufficient to bind said particles together upon hydration.

A specific example of a refractory mixture of this invention is one containing 43 mol percent alumina, $Al_2O_3$, 30 mole percent calcia, $CaO$, 14 mol percent silica, $SiO_2$, and 13 mol percent zirconia, $ZrO_2$.

A block of concrete having the above composition was placed in an exhaust stream of a test rocket engine at a point about 54 inches below the exit nozzle. The exhaust gases impinged on the surface of the concrete block at a 45-degree angle. The exhaust velocity was supersonic at the point of impingement and the stagnation temperature at the surface of the block was slightly about 4,000° F. The erosion at the point of impact or impingement of the gases was about .054 inch. This is to be compared with the erosion observed when a block of conventional concrete cast with Portland cement was used under similar test conditions. In the latter case, the erosion was about .296 inch in the same period of time, namely 20 seconds. This represents an erosion which is 5.5 times as great as that observed when the concrete block of this invention is subject to the destructive action of the hot gaseous stream. The Portland cement concrete consisted of a standard mixture of 1 part of Portland cement and 6 parts of aggregate, which in turn was made up of 2 parts of fine and 4 parts of coarse rock. This provided a Group IA plus Group IIA metal oxide content such that the mol ratio of these components to-the-silica content in the cement and the fines was about 0.3. It is seen that this is far below the comparable ratio in applicants' concrete composition.

Applicants have discovered that in order to obtain a concrete composition that will not spall or melt and readily flow upon being subjected to a high temperature and high velocity gaseous stream, the ratio of the Groups IA plus IIA metal oxides-to-silica in that portion of the mixture in which particles are of a size which will pass through a U.S. No. 4 mesh screen, is from about 1.7 to about 2.4. The particles which pass through a No. 4 mesh screen include the cement which has been added, and therefore from about 60 to about 70 weight percent of these particles will also pass through a No. 200 mesh screen. When the ratio is less than 1.7, the amount of silica, $SiO_2$, in this portion of the mix is too high, with the result that upon reaching high temperatures, predominantly low melting point glasses will be formed. These low melting glasses will be readily blown away in the molten state by the high velocity exhaust gases. With the molten glasses will go the aggregate. When the ratio exceeds about 2.4, the amount of silica is too low and this results in formation of high melting point glasses enriched in lime. Solidification and cooling of such a mixture will result in a surface which is extremely brittle and subject to cracking by thermal shock.

That portion of the components which pass through a No. 4 mesh screen are referred to as fines throughout this writing, whereas the particles which will not pass through a No. 4 mesh screen are referred to as coarse aggregate or components. It is found that a satisfactory concrete product is obtained upon hydration when from about 60 to aboout 70 weight percent of the fines are of a particle size which will pass through a No. 200 mesh screen. The mesh sizes given in this writing are the U.S. mesh numbers as found in the "Handbook of Chemistry and Physics," 41st edition, published by the Chemical Rubber Publishing Company, Cleveland, Ohio. It is preferred to employ at least about 60 weight percent of particles in the fines that will pass through a No. 200 mesh screen in order that a maximum amount of coarse aggregate may be added to the mixture and satisfactorily cemented together upon hydration to subsequently withstand the action of high velocity, high temperature exhaust gas streams. If higher than 70 weight percent of the fines are of a particle size which will pass through a No. 200 mesh screen, the compressive strength of the resulting concrete may be considerably weakened.

The Group IA metal oxides include the oxides of lithium, sodium, potassium rubidium, and cesium. However, in the cement and aggregate employed in the preparation of the concrete of this invention, the main Group IA constituents are the sodium and potassium oxides. The oxides of the other Group IA metals, if any, will be present in the form of impurities and usually negligible in amount. No differentiation is made in this writing between the relative amounts of sodium and potassium oxides since both react with silica to form glasses. Thus, the Group IA metal oxides may be all sodium oxide or all potassium oxide or any mixture of the two.

The Group IIA metal oxides are the beryllium, magnesium, calcium, strontium, and barium metal oxides. Of these, the magnesium oxide and calcium oxide predominate in cement and concrete aggregate compositions. The other Group IIA metal oxides, if any, will be present as minor impurities. It is preferred that the calcium oxide be present in at least about 90 weight percent, or at least about 86.4 mol percent based on the magnesium and calcium oxides in the fines. In other words, a preferred embodiment of this invention is a composition in which the Group IIA metal oxides in that portion of the mixture having particles of a size which will pass through a No. 4 mesh screen, is composed of at least about 90 weight percent of calcium oxide. The magnesium oxide imparts a characteristic of brittleness to the composition and increases thermal shocking which becomes significant when the amount of magnesium oxide exceeds about 10 weight percent of the Group IIA metal oxides in the fines. Since this is detrimental to erosion resistance, the use of higher amounts of magnesium oxide are not contemplated.

The Group IA and the Group IIA metal oxides react with silica to form silicates under favorable conditions. It is not intended that the scope of this invention be limited by any theory in support of the reason why the concrete composition of this invention is highly resistant to thermal shock and high velocity gas stream erosion at elevated temperatures. It has, however, been found that when the amount of Group IA metal oxides in the combined Group IA and IIA metal oxides in the fines exceed about 5 weight percent, the erosion due to the action of high velocity streams of gases at elevated temperatures is increased considerably. Therefore, an embodiment of this invention is a mixture in which the Group IIA metal oxides constitute at least about 95 weight percent of the combined Group IA and Group IIA metal oxides in the fines. It is also found that when the amount of Group IA metal oxides in the concrete mixtures as a whole exceeds about 6 weight percent, the erosion susceptibility of the concrete is increased. Therefore, an embodiment of this invention is a refractory mixture in which the amount of Group IA metal oxides is not more than about 6 weight percent based on the total weight of the mixture.

Another component of the refractory mixture of this invention is silica, $SiO_2$. It is believed that the silica reacts with other components of the refractory mixture at elevated temperatures to form other subsances which, if made up of suitable chemical structural units, is even more resistant to erosion at elevated temperatures. The reaction at elevated temperatures is experienced at or near the surface of the finished concrete and depends, of course, on the proximity of silica to other reactive components. The elevated temperatures are brought about by impinging hot exhaust gases on the flame deflectors. Since the reactivity of the silica will depend on its proximity to the reactive groups, only that silica having a particle size which will pass through a No. 4 mesh screen is of concern. It has been found, for example, that satisfactory erosion resistance is observed when the mol ratio of the combined Group IA and IIA metal oxides-to-silica is from about 1.7 to about 2.4. When this ratio has a value of less than 1.7, a mixture of silicates, predominating in the low melting point mono calcium silicate, will be formed, resulting in these silicates and the aggregates which they bind being easily blown away. When, on the other hand, the value exceeds 2.4, a mixture of silicates, high in dicalcium silicate content, is formed plus an excess of the Group IIA oxides. This excess of Group IIA oxides will impart brittleness and thermal shocking characteristics to the glazed surface. Thus, a preferred embodiment of this invention is a refractory in which the above stated mol ratio in the fines is from about 1.7 to about 2.4. An especially preferred range of values for this mol ratio is from about 1.9 to about 2.2 as it is found that the maximum amount of the high melting point dicalcium silicate will be formed with a minimum of excess of Group IIA oxides. Thus, a high melting point glass is formed which serves as a bonding agent to hold the aggregate in the concrete surface. This bonding agent is also less subject to thermal shock.

The other components of the refractory mixture of this invention comprise particles of at least one component selected from the group consisting of alumina, $Al_2O_3$, sirconia, $ZrO_2$, silicon carbide, and oxides of the Group VIII elements of the Periodic Table. Non-limiting examples of the oxides in the Group VIII metals include the various oxides of iron, the oxides of cobalt, nickel oxide, etc. The above oxides and carbide are bound together in the finished concrete by the hydrated fines. The oxides in question are of a fairly high melting point and thus will withstand the high temperatures present in the surface of a flame deflector made of a refractory mixture of this invention. It is found, however, that in order to obtain a satisfactory high temperature and erosion resistant flame deflector composition, at least about 50 mol percent of the total composition of the oxides and carbide named in this paragraph have a melting point of at least about 2,050° C. When less than about 50 mol percent of the components melt at temperatures of 2,050° C., or higher, the erosion due to the high velocity gas streams during flame deflection is increased so that the life of the deflectors is considerably lessened. Therefore, an embodiment of this invention is a refractory mixture in which at least about 50 mol percent of the oxides and carbide referred to in this paragraph having a melting point of at least about 2,050° C. The higher the weight percent composition of the oxides and carbide melting above 2,050° C., the more erosion-resistant becomes the concrete product. There is, therefore, no upper limit to the fraction of components melting above about 2,050° C.

It was stated hereinabove that certain amounts of specific components are of a particle size which will pass through a U.S. No. 200 mesh screen, a No. 4 mesh screen, or both. The composition of this invention employs the same components also in particles of a size which will not pass through a No. 4 mesh screen. Particles of the larger size are referred to as "coarse" particles or aggregates. The metal oxides and carbide referred to in the previous paragraph are of particles having a size which will permit them to pass through a No. 200 mesh screen, a No. 4 mesh screen, or a combination of two or more of the sizes. In general, the coarse aggregate ranges in particles having a diameter of from about one-eighth inch to about one and one-half inches. Coarse aggregate having particle sizes in excess of one and one-half inches diameter can also be used. It is preferable, however, to employ aggregate in which the diameter of the largest particle is not more than about one-quarter of the thickness of any concrete product made from the refractory mixture of this invention. When making concrete blocks, floors, or runways which will serve to deflect high temperature and high velocity flow of exhaust gases, it is found that good heat and erosion resistant concretes are obtained when the particle size ranges from about one and one-half inches on down, and refractory mixtures having particles of this size and smaller sizes constitute a preferred embodiment of this invention. For example, it is found that very good erosion resistance is obtained when the coarse aggregate employed in the refractory mixture has particles of a size varying from one-eighth inch to one and one-half inches, wherein not over about 20 weight percent of the particles therein have a diameter of from about three-eighths inch to about one and one-half inches.

The amount of Groups IA and IIA metal oxides and silica employed in the form of fines, is sufficient to bind all the particles of the mixture together upon hydration. It is found, for example, that the mol ratio of the combined Groups IA and IIA metal oxides and silica-to-the total number of mols in the mixture varies from about 1:1.4 to about 1:9 in acceptable concrete compositions. Mol ratios higher in value than 1:1.4 can be employed but no particular advantage is gained thereby and only result in an increase in cost. On the other hand, when mixtures are employed in which the subject mol ratio is of a value lower than 1:9, the amount of binding components becomes too low, with the result that hot exhaust gases at supersonic velocities more rapidly erode away the concrete product.

In addition to the components discussed hereinabove, other components may be present in the form of impurities in the refractory mixture of this invention. The amount of such impurities can vary from 0 to about 10 weight percent based on the total weight of the mixture. In order that the impurities do not appreciably affect the desirable properties of the refractory mixture, at least about 50 weight percent of the components other than the Group IA and IIA metal oxides and silica in the fines should have a melting point of at least about 2,050° C., as stated hereinabove. Non-limiting examples of impurities often found in aggregates employed in the making of concrete are titanium dioxide, oxides of hafnium, etc.

The following Table I gives the composition of a number of refractory mixtures of this composition.

TABLE I

| Comp. No. | Particles | Components, in parts by weight | | | | | | | | | | |
|---|---|---|---|---|---|---|---|---|---|---|---|---|
| | | Na₂O | K₂O | MgO | CaO | SiO₂ | Al₂O₃ | ZrO₂ | Fe₂O₃ | SiC | Others | Total |
| 1 | Fines | .8 | .5 | 4 | 39 | 23 | 46 | | 20 | | 2.7 | 136 |
| 2 | Fines | .8 | .5 | 4 | 39 | 23 | 46 | | 20 | | 2.7 | 136 |
|   | Coarse | 6.5 | 2.7 | 18 | 18 | 86 | 42 | | 18 | | 11.8 | 203 |
| 3 | Fines | | | | 26 | 12.5 | 67 | 25 | | | 1.5 | 132 |
|   | Coarse | | | | | 61 | 122 | | | | 2 | 185 |
| 4 | Fines | | | | 26 | 12.5 | 67 | 25 | | | 1.5 | 132 |
| 5 | Fines | | | | 26 | 12.5 | 67 | 25 | | | 1.5 | 132 |
|   | Coarse | | | | | 79 | 158 | | | | 3 | 240 |
| 6 | Fines | | | | 26 | 12.5 | 67 | 25 | | | 1.5 | 132 |
|   | Coarse | | | | | 36 | 73 | | | 80 | 1 | 190 |
| 7 | Fines | | | | 26 | 12.5 | 67 | 25 | | | 1.5 | 132 |
|   | Coarse | | | | | 50 | 99 | | | 90 | 1 | 240 |
| 8 | Fines | | | | 26 | 12.5 | 67 | 25 | | | 1.5 | 132 |
|   | Coarse | | | | | 50 | 183 | | | 90 | 1 | 324 |
| 9 | Fines | 1 | 0.8 | .6 | 36 | 25 | 41.4 | 17 | | | 1.2 | 124 |
|   | Coarse | 20 | 7 | 10 | 13 | 340 | 68 | | 15 | | 7 | 480 |
| 10 | Fines | 1.4 | .8 | 4.3 | 39.3 | 21.6 | 47 | | 20 | | 1.6 | 136 |
|   | Coarse | 20 | 13 | 9 | 12 | 342 | 80 | | 106 | | 8 | 590 |
| 11 | Fines | | | | 26 | 16.2 | 67 | 32.4 | | | 1 | 142.6 |
|   | Coarse | | | | | | 55 | | | | | 55 |
| 12 | Fines | | | | 26 | 14.5 | 67 | 29 | | 3 | | 140.5 |
|   | Coarse | 6 | 5 | 18 | 18 | 86 | 42 | | 18 | | 10 | 203 |

TABLE I—Continued

| Comp. No. | Particles | Mol ratio (groups IA and IIA oxides):SiO$_2$ in fines | Mol ratio (groups IA and IIA oxides and SiO$_2$ in fines):total solids | Wt. percent comp. m.p. at least 2,050° C. excluding grps. IA and IIA oxides and SiO$_2$ | Wt. percent group IA oxides in groups IA and IIA oxides in fines | Wt. percent MgO in MgO and CaO in fines |
|---|---|---|---|---|---|---|
| 1 | Fines | 2.2:1 | 1:1.5 | 70 | 3 | 9 |
| 2 | Fines | 2.2:1 | | | 3 | 9 |
|   | Coarse | | 1:3.7 | 63 | | |
| 3 | Fines | 2.2:1 | | | | |
|   | Coarse | | 1:5.3 | 99 | | |
| 4 | Fines | 2.2:1 | | | | |
| 5 | Fines | 2.2:1 | | | | |
|   | Coarse | | 1:6.2 | 99 | | |
| 6 | Fines | 2.2:1 | | | | |
|   | Coarse | | 1:7 | 99 | | |
| 7 | Fines | 2.2:1 | | | | |
|   | Coarse | | 1:8.1 | 99 | | |
| 8 | Fines | 2.2:1 | | | | |
|   | Coarse | | 1:9 | 99 | | |
| 9 | Fines | 1.68:1 | | | 4.7 | 1.7 |
|   | Coarse | | 1:8.1 | 77 | | |
| 10 | Fines | 2.4:1 | | | 5 | 9.9 |
|   | Coarse | | 1:9 | 50 | (6 wt. percent in total mix) | |
| 11 | Fines | 1.7:1 | | | | |
|   | Coarse | | 1:3 | 99 | | |
| 12 | Fines | 1.9:1 | | | | |
|   | Coarse | | 1:6.6 | 89 | | |

From composition No. 10 in Table I, it is seen that out of a total of 726 parts by weight of fines and coarse aggregate, there are at least 136 parts by weight, or 19 weight percent, of fines. From composition No. 8, it is seen that out of a total of 456 parts by weight of fines and coarse aggregate, at least 88.5 parts by weight, or at least 19 weight percent, consist of Group IA metal oxides, Group IIA metal oxides, and silica. It is also seen from the composition of the fines in compositions No. 1 and No. 9 in Table I, that the combined Group IA, Group IIA, and silica components make up 52 and 50 weight percent of the fines respectively. Also from composition No. 9, it is seen that the combined amounts of Groups IA and IIA metal oxides and silica make up a maximum 75 weight percent of the total mixture. From compositions 3–8 of Table I, it is further seen that the minimum amount of Groups IA and IIA metal oxides and silica is about 29 weight percent, based on the amount of fines in the mixture.

Table II, as is set forth hereinafter, tabulates the weight percents of the components in the compositions listed in Table I.

TABLE II

| Comp. No. | Particles | Weight percent of components | | | | | | |
|---|---|---|---|---|---|---|---|---|
| | | Na$_2$O and K$_2$O | MgO and CaO | SiO$_2$ | Al$_2$O$_3$ | ZrO$_2$ | Fe$_2$O$_3$ | SiC |
| 1 | Fines | 1.0 | 31.6 | 16.9 | 33.8 | | 14.7 | |
| 2 | Fines | 1.0 | 31.6 | 16.9 | 33.8 | | 14.7 | |
|   | Coarse | 4.5 | 17.7 | 42.4 | 20.7 | | 8.9 | |
|   | Total | 3.1 | 23.3 | 32.2 | 26.0 | | 11.2 | |
| 3 | Fines | | 19.7 | 9.5 | 50.8 | 19.0 | | |
|   | Coarse | | | | 33.0 | 66.0 | | |
|   | Total | | 8.2 | 23.2 | 21.1 | 46.4 | | |
| 4 | Fines | | 19.7 | 9.5 | 50.8 | 19.0 | | |
| 5 | Fines | | 19.7 | 9.5 | 50.8 | 19.0 | | |
|   | Coarse | | | 32.9 | | 65.8 | | |
|   | Total | | 7.0 | 24.6 | 18.0 | 49.2 | | |
| 6 | Fines | | 19.7 | 9.5 | 50.8 | 19.0 | | |
|   | Coarse | | | 19.0 | | 38.4 | | 42.1 |
|   | Total | | 8.1 | 15.0 | 20.8 | 30.4 | | 24.8 |
| 7 | Fines | | 19.7 | 9.5 | 50.8 | 19.0 | | |
|   | Coarse | | | 20.8 | | 41.2 | | 37.5 |
|   | Total | | 7.0 | 16.8 | 18.0 | 33.4 | | 24.2 |
| 8 | Fines | | 19.7 | 9.5 | 50.8 | 19.0 | | |
|   | Coarse | | | 15.4 | | 56.5 | | 27.8 |
|   | Total | | 5.7 | 13.7 | 14.7 | 45.6 | | 19.8 |
| 9 | Fines | 1.5 | 29.4 | 20.1 | 33.4 | 13.7 | | |
|   | Coarse | 5.6 | 4.8 | 70.8 | 14.2 | | 3.1 | |
|   | Total | 4.8 | 8.2 | 60.5 | 18.1 | 2.8 | 2.5 | |
| 10 | Fines | 1.0 | 32.1 | 11.8 | 34.5 | | 14.7 | |
|   | Coarse | 5.6 | 3.5 | | 13.5 | | 18.0 | |
|   | Total | 4.7 | 8.9 | 2.2 | 17.5 | | 17.3 | |
| 11 | Fines | | 18.2 | 11.3 | 47.0 | 23.7 | | |
|   | Coarse | | | | | 100.0 | | |
|   | Total | | 13.2 | 8.2 | 61.7 | 16.4 | | |
| 12 | Fines | | 18.5 | 10.3 | 47.7 | 20.6 | | 2.1 |
|   | Coarse | 5.4 | 17.7 | 42.3 | 20.7 | | 8.9 | |
|   | Total | 3.2 | 18.1 | 29.3 | 31.7 | 8.4 | 5.2 | 0.9 |

Table II shows that for the compositions set forth therein, alumina is present in the fine particles in an amount of from about 33 to about 51 weight percent; the oxides of Group IIA metals (magnesium and calcium) are present in the fine particles in an amount from about 18 to about 32 weight percent; zirconia is present in the mixture of fine and coarse particles in an amount of from 0 to about 49 weight percent, and when present zirconia is present in the fine particles in an amount of from about 13 to 24 weight percent; iron oxide, when present, may be present in the mixture in an amount up to about 17 weight percent; and silicon carbide may be present in the mixture in an amount up to about 24.8 weight percent.

The amount of water used in the preparation of the concrete for the refractory mixture of this invention is that sufficient to hydrate the cementing or binding components. It is found, for example, that the amount varies from 10 weight percent to 15 weight percent based on the total weight of the solids in the mixture.

In the mixtures given in the above Tables I and II, the fines are components of a particle size which will pass through a U.S. No. 4 mesh screen. Of these, from about 60 to about 70 weight percent also pass through a U.S. No. 200 mesh screen. The coarse aggregate is made up of components having a particle size ranging from one-eighth inch to one and one-half inches, with not over about 20 percent in the range of three-eighths inch to one and one-half inches.

Cement is used in preparing the fines employed in the refractory mixture. For example, the fines of Composition No. 1 in the Tables I and II are composed of 94 parts by weight of cement having the following composition: 37 parts alumina, 35 parts calcia, 5 parts silica, 16 parts iron oxide, and 1 part of other components. From about 92 weight percent to about 96 weight percent of the cement is of a particle size which passes through a U.S. No. 200 mesh screen. The balance passes through a U.S. No. 170 mesh screen. The balance of the fines are made of 42 parts by weight of an aggregate having particles of a size that pass through a U.S. No. 4 mesh screen, and have the following composition: 9 parts alumina, 4 parts magnesia, 4 parts calcia, 18 parts silica, 4 parts oxides of iron, .8 part sodium oxide, .5 part potassium oxide, and 2.7 parts of other components. The combination of the cement and the fines aggregate makes up the fines of Composition No. 1 in the Tables I and II. The fines in all the other compositions are made up in a similar manner, using various cements and fines aggregate. It is to be understood that it is not necessary that the components of the fines be made from a mixture known in the art as cement. All that is necessary is that the fines have the composition set out in the discussion hereinabove as exemplified by the examples in the Tables I and II. For example, Composition No. 1 in the Tables I and II is also made up by mixing together each of the components listed in the Tables I and II in the proportions indicated. The same holds true for the coarse aggregate. Particle size of the coarse aggregate has been given hereinabove. The fines in each of the examples given in the Tables I and II is equivalent to 94 parts by weight of cement of a particle size such that from 92 to about 96 weight percent pass a U.S. No. 200 mesh screen, and the balance of the fines is made up of an aggregate the particles of which pass through a U.S. No. 4 mesh screen. Examples I, II, VIII, and IX employed cement having the composition set out hereinabove. Examples III, VII, X and XI employed a cement having the following composition in parts by weight; 67 parts alumina, 26 parts calcia, and 1 part of other components. The other components in the cement are composed of impurities such as titanium dioxide, hafnium dioxide, etc.

The concrete is prepared by first mixing thoroughly the proper amounts of the components. The proper amount of water is then added and the mixing continued until a uniform consistency is obtained. The mix is then poured on the construction project, runway, launching pad or test stand deflecting area, or into a suitable form in the case where small blocks are made. The refractory mixtures of this invention set quite rapidly after being mixed with water, therefore it is preferable to pour the concrete as soon as possible after obtaining a mix of a uniform consistency. The surface of the poured concrete is preferably finished with a minimum of wood trowelling in order to avoid raising too much fines to the surface. The finishing is also accomplished by rolling with weighted roller. The surface of the poured concrete is kept wet by suitable application of water sprays for a period of from about 8 to about 15 hours in order to provide for proper curing.

The following examples will illustrate the preparation of concrete from the mixes disclosed in Tables I and II hereinabove.

*Example I*

The components of Composition No. 1 of the Tables I and II are added in the proportions indicated to a mortar mixer. The components are subjected to a tumbling action in the mixer until a substantially uniform composition is obtained. An amount of water is then added, while continuing the mixing, sufficient to form a uniform paste. The water-containing mixture is then poured into 14½" x 14½" x 4" forms. When the form is filled, the surface is leveled with a minimum of trowelling with a wood float. The exposed surfaces of the blocks in the forms are kept wet for substantially 12 hours by spraying with water at appropriate intervals in order to allow proper curing.

The procedure of Example I is repeated, employing 15 weight percent water based on the weight of the solids. The exposed surfaces of the poured blocks are kept moist with water sprays at appropriate intervals for a period of 8 hours so as to maintain a moist surface during the entire period.

The process of Example I is repeated, employing 10 weight percent water based on the weight of the solids. The surface of the poured concrete in the forms is kept moist by means of water sprays at appropriate intervals for a period of 16 hours.

*Example II*

The procedure of Example I was followed in the preparation of concrete blocks using the components given in Composition No. 2 of Tables I and II. The amount of water employed was 13.2 weight percent based on the weight of the total solids.

*Example III*

The procedure of Example I was employed in the preparation of a concrete composition from the components of Composition No. 3 of Tables I and II. An amount of water was used equivalent to substantially 11 weight percent based on the total weight of the solids.

*Example IV*

The procedure of Example I is followed in the preparation of a concrete composition employing the components of Composition No. 4 of the Table. An amount of water equal to 13 weight percent is used, based on the total weight of the solids.

Each of the above described concrete mixtures upon hydration, and pouring, cure rapidly and within 24 hours attain a compressive strength of substantially 7,900 lbs. per square inch as determined by procedures set out in ASTM C 31–55 and C 39–49.

The various concrete mixture compositions of Tables I and II were tested in the form of cast concrete blocks substantially 14½" x 14" x 4" in dimensions, with the results indicated in the following Table III. A test block was placed in the path of a supersonic exhaust gas stream from a test rocket engine at a downstream distance of 34 inches from the engine exit nozzle, and at a 45° impingement angle. The velocity of the exhaust gases at the surface of the concrete was supersonic. The stagnation temperature of the boundary layer at the surface of the block was slightly above 4,000° F. The erosion data for various compositions is tabulated in Table III.

TABLE III

| Test No. | Comp. identity from Table I | Dur. of exhaust deflection, sec. | Weight, lbs. Orig. | Weight, lbs. Final | Wt. loss rate, lb. sec. | Mean erosion rate, in sec. from wt. loss | Deepest pit, inch | Peak erosion rate in sec. |
|---|---|---|---|---|---|---|---|---|
| 1 | Comp. No. 3, 1-in. layer on Comp. No. 2, 2¾ in. base. | 8 | 67.6 | 66.8 | 0.100 | 0.00425 | 0.047 | 0.00585 |
|   |   | 8 | 66.8 | 65.9 | 0.112 | 0.00475 | 0.235 | 0.0234 |
|   |   | 16 | 65.9 | 64.2 | 0.106 | 0.0045 | 0.266 | 0.00195 |
|   |   | 32 | 64.2 | 61.25 | 0.092 | 0.039 | 0.548 | 0.0088 |
|   |   | 60 | 61.25 | 56.9 | 0.071 | 0.0030 | 0.875 | 0.0055 |
|   | Total | 124 | 67.6 | 56.9 | 0.086 | 0.0037 | 0.875 | 0.00705 |
| 2 | Comp. No. 2, 3⅞ in. thick | 8 | 57.6 | 55.5 | 0.262 | 0.0176 | 0.500 | 0.0625 |
|   |   | 16 | 55.5 | 51.3 | 0.262 | 0.0176 | 1.125 | 0.039 |
|   | Total | 24 | 57.6 | 51.3 | 0.262 | 0.0176 | 1.125 | 0.047 |
| 3 | Comp. No. 4, 3⅞ in. | 8 | 48.7 | 46.4 | 0.288 | 0.0229 | 0.5625 | 0.070 |
|   |   | 16 | 46.4 | 41.5 | 0.306 | 0.0243 | 1.4375 | 0.055 |
|   | Total | 24 | 48.7 | 41.5 | 0.300 | 0.0238 | 1.4375 | 0.060 |
| 4 | Comp. No. 4, 1-in. layer on Comp. No. 2, 3 in. base. | 8 | 71.4 | 70.7 | 0.0875 | 0.0037 | 0.187 | 0.0234 |
|   |   | 8 | 70.7 | 68.7 | 0.250 | 0.0106 | 0.250 | 0.0079 |
|   |   | 16 | 68.7 | 67.0 | 0.016 | 0.0045 | 0.250 | (1) |
|   |   |   | 67.0 | 64.1 | 0.181 | 0.0076 | 0.375 | 0.0078 |
|   | Total | 48 | 71.4 | 64.1 | 0.152 | 0.0064 | 0.375 | 0.0078 |
| 5 | Comp. No. 6 | 55.5 | 81.45 | 70.3 | 0.201 | 0.0099 | 1.375 | 0.0248 |
|   |   | 16 | 70.3 | 67.4 | 0.181 | 0.0089 | (2) | (3) |
|   | Total | 71.5 | 81.45 | 67.4 | 0.196 | 0.0096 |   |   |
| 6 | Comp. No. 5 field pour on broken No. 2 base. | 8 | 61.7 | 60.7 | 0.125 | 0.0053 | 0.0625 | 0.0078 |
| 7 | Comp. No. 1, 3⅞ in. thick | 8 | 63.8 | 62.1 | 0.212 | 0.0129 | 0.109 | 0.0137 |
|   |   | 16 | 62.1 | 61.1 | 0.0625 | 0.0038 | 0.250 | 0.0088 |
|   | Total | 24 | 63.8 | 61.1 | 0.112 | 0.0068 | 0.250 | 0.0104 |

¹ No additional.
² Block broken.
³ No measurement.

From Table III it is seen that a maximum erosion is 0.025 in./sec. Erosion rates decrease progressively with repeated exposures to flame impingement. This phenomena is believed due to replacement of the hydrated cement bonding of aggregate by high melting point glass bonding. The best refractory mix is obviously Composition No. 3 or block No. 1.

Test block No. 1 in Table III was found to be exceptionally good in withstanding the erosive action of high temperature exhaust gases. At the end of the first 8-second firing there were only three pits, the deepest being ⁹⁄₆₄″, with no evidence of fusing on the surface. Sometime during the second 8-second firing, the block surface slagged and the erosion rate increased. On cooling, the block surface was found to have set in an extremely hard, glossy, rippled form. The block was then fired upon for periods of 16, 32, and 60 seconds with the erosion decreasing with each run. In other words, subjecting at least a portion of the surface of a concrete block of the composition of this invention which contains zirconium oxide to a temperature sufficient to melt a portion of the components in said portion of said surface, results in a modification of the surface to a state in which it thereafter is more resistant to the erosive action of impinging high velocity gaseous streams. A preferred embodiment of this invention is, therefore, a concrete composition described hereinabove wherein the surface layer of at least about 0.5″ in thickness contains from about 4 to about 77 weight percent zirconium oxide based on the combined weight of silica and zirconia.

An example of concrete compositions containing a zirconium oxide in the surface layer is a block of concrete having a 3-inch base of Composition No. 2 of Tables I and II and a half inch surface layer of Compostiion No. 9 of Tables I and II. Another example is a concrete block having a 2-inch base of concrete of Composition No. 6 of Tables I and II and a 2-inch upper layer of Composition No. 8 of Tables I and II. When these compositions are subject to impinging hot exhaust gases from test rocket motors, as were the blocks listed in Table III, with the hot exhaust gases impinging upon the zirconium oxide-containing surface, some of the components on the surface of the zirconium oxide-containing concrete are found to first melt and then solidify into a modified surface which is more resistant to the erosive action of high velocity, high temperature gaseous streams.

When the composition identified as No. 10 in Tables I and II is modified by an increase in the amount of Group IA and Group IIA oxides so that the mol ratio of Group IA and Group IIA oxides-to-silica in the fines is substantially 2.5, it is found that a surface which is brittle and more easily thermally shocked results. On the other hand, when the amount of Group IA and Group IIA oxides in Composition No. 11 are decreased so that the mol ratio of Group IA and IIA oxides-to-silica in the fines is substantially 1.5, which is below the minimum set out in this specification, it is found upon testing that the compressive strength of concrete is reduced and the fused surface possesses a reduced melting point and flows at a lower temperature.

When the Composition No. 10 of Tables I and II is altered by increasing the amount of sodium oxide and potassium oxide in the Group IA and IIA oxides so that these two oxides represent 7 weight percent of the total Group IA and IIA, oxides, it is found upon testing that the surface melting point is substantially reduced.

When Composition No. 10 is modified by increasing the amount of the magnesium oxide so that the amount of this component is substantially 12 weight percent based on the total amount of Group IIA oxides, it is found that upon testing brittleness and cracks from thermal shocking results.

When the total amount of sodium oxide and potassium oxide in the mixture as a whole is modified in Composition No. 10 to represent substantially 8 weight percent of the total solid weight, it is found upon testing that the entire mixture, including the aggregate, has reduced melting points.

When the Composition No. 10 is modified by the addition of excess oxides of iron so that the weight of alumina is substantially 40 weight percent based on the total weight of alumina, zirconia, Group VIII oxides, and silica carbide, it is found upon testing that the compressive strength is reduced and erosion rates are increased.

The amount of fines that pass through a No. 200 mesh screen has been stated to be from about 60 to about 70 weight percent, this figure is not critical. All that is necessary is that sufficient amount of fines be present having a particle size of this order of magnitude in order that, upon the addition of water, the calcium oxide and other components will hydrate to bind together all the particles of the mixture, and also, that upon exposure to the extreme heat of the exhaust gases, whatever reaction takes place between the components will result in a minimizing of spalling and erosion.

As indicated above, no coarse aggregate need be present in the mixture. Test blocks of Composition No. 1 and No. 4 give substantially better test results than those observed for Compositions No. 2 and 5 respectively. However, it is preferable to employ coarse aggregate in order to lower the cost of the concrete. From Test No. 3 in Table III it is seen that a cast concrete block having a base of the Composition No. 2 and a surface layer of Composition No. 4 serves well as a dry flame deflector. Such a combination is particularly attractive because of the much lower cost due to the fact that expensive zirconium silicate aggregate is employed only in the surface layer. Therefore, an embodiment of this invention is a cast concrete composition in which the base does not contain zirconium silicate and wherein the surface layer of from about one-half inch to about four inches contains from about 3 to about 50 weight percent zirconium oxide based on the total solids content. It will be noted that in the tables, the amount of zirconium silicate is given in terms of weight percent zirconium oxide and weight percent silica. In Composition No. 8, however, zirconium and silicon are added to the mixture in the form of their respective oxides.

An aircraft runway poured from concrete having the composition of No. 2 in Tables I and II is found to have good resistance to erosion and spalling normally caused by exhaust gases from jet aircraft.

A launching pad cast of concrete having the composition of No. 2 of tables I and II, together with a surface 2-inch layer of Composition No. 4 exhibits a minimum surface erosion due to the action of impinging exhaust gases from space vehicles which are being launched.

A test block was poured employing ordinary Portland cement having the following composition in percentages by weight: 2.9 weight percent magnesium oxide, 63.2 weight percent calcium oxide, 21.3 weight percent sili, 6 weight percent alumina, 2.7 weight percent iron oxides, 1.8 weight percent $SO_3$, 1.5 weight percent impurities, together with an aggregate composed essentially of silica.

The concrete block pour mixture consisted of 15 parts by weight of cement mixed together with 35 parts by weight of fines and 64 parts of coarse aggregate and 98 parts by weight of water. The concrete was poured in block form having dimensions of 14½" x 14½" x 4", and tested as described above using a test stand engine. The mean erosion rate was found to be 0.0162 inch per second. This is 240 percent higher than that of Test No. 7 above employing Composition No. 1, and 440 percent higher than Test No. 1 above employing Composition No. 3 as a surface layer.

Although the invention has been described in detail, it is to be clearly understood that the same is by way of illustration and example only and is not to be taken by way of limitation, the spirit and scope of this invention being limited only by the terms of the appended claims.

We claim:

1. A mixture which upon hydration forms a solid mass and when the surface of said mass is subjected to impingement of gases at a temperature sufficient to cause the surface of the mass to melt, forms a high temperature resistant concrete, said mixture consisting essentially of at least 19 weight percent of fine and the balance of coarse particles, wherein said fine particles are of a size which will pass through a No. 4 mesh screen and wherein from about 60 to 70 weight percent of said fine particles will pass through a No. 200 mesh screen, and said coarse particles are of a diameter ranging from about one-eighth to about one and one-half inches with not over 20 weight percent of coarse particles ranging in diameter from three-eighths to one and one-half inches; the composition of said mixture consisting essentially of the following components:
   (1) alumina in an amount of from about 33 to about 51 weight percent in said fine particles;
   (2) at least one oxide of the Group IIA metals in an amount in said fine particles of from about 18 to about 32 weight percent, and wherein at least about 90 weight percent of component (2) in said fine particles is calcia;
   (3) silica in an amount such that the mol ratio of component (2) in said fine particles to silica in said fine particles is from about 1.7:- to about 2.4:1;
   (4) zirconia in an amount of from 0 to about 49 weight percent;
   (5) at least one oxide of the Group IA metals in an amount of from 0 to about 6 weight percent;
   (6) iron oxide in an amount of from 0 to about 17 weight percent; and,
   (7) silicon carbide in an amount of from 0 to about 24.8 weight percent.

2. As a new article of manufacture a casting of a concrete mixture having the composition of claim 1.

3. A process of producing a high temperature-resistant concrete comprising mixing, to provide a uniform composition, the mixture of claim 1 with a minor quantity of water sufficient to form a uniform paste thereof, permitting said paste to set in order to form a solid mass, and thereafter causing a stream of gases at supersonic velocities to impinge upon at least a portion of the surface of said solid mass, said gases being at a temperature sufficient to cause at least a portion of the components in said surface to melt, whereby said molten components react to provide a concrete surface which is resistant to erosion at high temperatures.

4. A mixture which upon hydration forms a solid mass and when the surface of said mass is subjected to impingement of gases at a temperature sufficient to cause the surface of the mass to melt, forms a high temperature resistant concrete, said mixture consisting essentially of at least 19 weight percent of fine and the balance of coarse particles, wherein said fine particles are of a size which will pass through a No. 4 mesh screen and wherein from about 60 to 70 weight percent of said fine particles will pass through a No. 200 mesh screen, and said coarse particles are of a diameter ranging from about one-eighth to about one and one-half inches with not over 20 weight percent of the coarse particles ranging in diameter from three-eighths to one and one-half inches; the composition of said mixture consisting essentially of the following components:
   (1) about 43 mol percent of alumina, and wherein the amount of alumina in said fine particles is from about 33 to about 51 weight percent of the fine particles;
   (2) about 30 mol percent of calcia, and wherein the amount of calcia in said fine particles is from about 18 to about 32 weight percent of the fine particles;
   (3) abouut 14 mol percent of silica, and wherein the mol ratio of calcia in said fine particles to silica in said fine particles is from about 1.9:1 to about 2.2:1; and,
   (4) about 13 mol percent of zirconia, and wherein the amount of zirconia in said fine particles is from about 13 to about 24 weight percent of the fine particles.

5. As a new article of manufacture a casting of a concrete mixture having the composition of claim 2.

6. A process of producing a high temperature-resistant concrete comprising mixing, to provide a uniform composition, the mixture of claim 4 with a minor quantity of water sufficient to form a uniform paste thereof, permitting said paste to set in order to form a solid mass, and thereafter causing a stream of gases at supersonic velocities to impinge upon at least a portion of the surface of said solid mass, said gases being at a temperature sufficient to cause at least a portion of the components in said surface to melt, whereby said molten components react to provide a concrete surface which is resistant to erosion at high temperatures.

References Cited by the Examiner

UNITED STATES PATENTS

| | | | |
|---|---|---|---|
| 1,255,995 | 2/18 | Eckel | 106—100 |
| 1,880,038 | 9/32 | Moore | 106—100 |
| 2,032,347 | 3/36 | Dahl et al. | 106—100 |
| 2,271,276 | 1/42 | Rolfsen | 106—100 |
| 2,516,893 | 8/50 | Lobaugh | 106—64 |
| 2,684,913 | 7/54 | West | 106—64 |
| 2,874,071 | 2/59 | Kadisch et al. | 106—64 X |
| 3,060,043 | 10/62 | Renkey | 106—64 |

ROBERT F. WHITE, *Primary Examiner*.

UNITED STATES PATENT OFFICE
CERTIFICATE OF CORRECTION

Patent No. 3,188,368 June 8, 1965

Robert F. Stewart et al.

It is hereby certified that error appears in the above numbered patent requiring correction and that the said Letters Patent should read as corrected below.

Column 14, line 25, for "1.7:- to about 2.4:1;" read -- 1.7:1 to about 2.4:1; --; line 71, for "abouut" read -- about --.

Signed and sealed this 22nd day of March 1966.

(SEAL)
Attest:

ERNEST W. SWIDER
Attesting Officer

EDWARD J. BRENNER
Commissioner of Patents